(12) United States Patent
Pratt et al.

(10) Patent No.: US 11,558,492 B2
(45) Date of Patent: Jan. 17, 2023

(54) MESSAGE PROCESSING

(71) Applicant: Metaswitch Networks Ltd., Enfield (GB)

(72) Inventors: Oliver Edward Pratt, Enfield (GB); Salem Al-Damluji, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/880,180

(22) Filed: May 21, 2020

(65) Prior Publication Data

US 2020/0374373 A1    Nov. 26, 2020

(30) Foreign Application Priority Data

May 24, 2019  (GB) ...................................... 1907384

(51) Int. Cl.
| | | |
|---|---|---|
| *H04L 69/08* | (2022.01) | |
| *H04L 65/102* | (2022.01) | |
| *H04L 69/22* | (2022.01) | |
| *H04L 65/1104* | (2022.01) | |

(52) U.S. Cl.
CPC ............ *H04L 69/08* (2013.01); *H04L 65/102* (2013.01); *H04L 65/1104* (2022.05); *H04L 69/22* (2013.01)

(58) Field of Classification Search
CPC .................................................. H04L 65/1006
See application file for complete search history.

(56) References Cited

U.S. PATENT DOCUMENTS

| | | | |
|---|---|---|---|
| 9,521,203 B2 | 12/2016 | Carter et al. | |
| 2002/0026533 A1* | 2/2002 | Dutta | ..................... H04L 69/329 719/313 |
| 2006/0211423 A1* | 9/2006 | Ejzak | ..................... H04W 68/00 455/445 |
| 2008/0082643 A1 | 4/2008 | Storrie et al. | |
| 2008/0219241 A1* | 9/2008 | Leinonen | .......... H04L 29/12594 370/352 |
| 2011/0103372 A1* | 5/2011 | Shatsky | .............. H04L 65/1016 370/352 |
| 2012/0198024 A1* | 8/2012 | Ishikawa | .......... H04N 21/64322 709/217 |
| 2012/0243549 A1 | 9/2012 | Lyons et al. | |

(Continued)

FOREIGN PATENT DOCUMENTS

| | | |
|---|---|---|
| EP | 1662701 A1 | 5/2006 |
| EP | 2843907 A1 | 3/2015 |

OTHER PUBLICATIONS

Oracle Net-Net Diameter Director, downloaded from https://docs.oracle.com/cd/E52367_01/doc/dd_dcz220_essentials.pdf, Sep. 2015.

(Continued)

*Primary Examiner* — William G Trost, IV
*Assistant Examiner* — Christopher P Cadorna
(74) *Attorney, Agent, or Firm* — Han Gim; Newport IP, LLC

(57) ABSTRACT

In a telecommunications network, a network node processes messages according to different sets of user-programmable message processing rules. The network node includes an input for receiving a series of input messages which are processed in a message manipulation function. Processed messages are also output from the network node according different communication protocols.

18 Claims, 9 Drawing Sheets

(56) References Cited

U.S. PATENT DOCUMENTS

2016/0021150 A1 1/2016 Larkin
2018/0041550 A1* 2/2018 Mufti .................. H04L 65/1083

OTHER PUBLICATIONS

Oracle Enterprise SBC, https://docs.oracle.com/cd/E80921_01/doc/esbc_ecz740_configuration.pdf, Oct. 2018.
"Office Action Issued in United Kingdom Patent Application No. 1907384.0", dated Nov. 12, 2019, 6 Pages.
"Office Action Issued in United Kingdom Patent Application No. 1907384.0", dated Sep. 16, 2021, 3 Pages.

* cited by examiner

| |
|---|
| INVITE sip:bob@biloxi.com SIP/2.0 |
| Via: SIP/2.0/UDP 212.97.59.88:5060;branch=z9hG4bK776asdhds |
| Max-Forwards: 70 |
| To: Bob <sip:bob@biloxi.com> |
| From: Alice <sip:alice@atlanta.com>;tag=1928301774 |
| Call-ID: a84b4c76e66710@pc33.atlanta.com |
| CSeq: 314159 INVITE |
| Contact: <sip:alice@pc33.atlanta.com> |
| Content-Type: application/sdp |
| Content-Length: 142 |
| User-Agent: Malsip12345 |

SIP Header

| |
|---|
| v=0 |
| o=balice 2890844526 2890842807 IN IP4 212.97.59.88 |
| s=session |
| t=2873397496 2873404696 |
| m=audio 49170 RTP/AVP 44 |
| a=rtpmap:44 G726-32/8000 |
| m=video 51372 RTP/AVP 99 |
| a=rtpmap:99 H264/9000 |

SIP Body

FIG. 8

MESSAGE PROCESSING

CROSS-REFERENCE TO RELATED APPLICATIONS

This application claims priority to GB Application No. 1907384.0, filed May 24, 2019, under 35 U.S.C. § 119(a). The above-referenced patent application is incorporated by reference in its entirety.

BACKGROUND OF THE INVENTION

Technical Field

The present disclosure relates to message processing. In particular, but not exclusively, the present disclosure relates to methods of processing messages, methods of programming message processing rules, computer programs, network nodes and telecommunications networks.

Background

Packet-based telecommunications networks typically include application gateway devices deployed at the boundaries between networks. For example, a Session Border Controller, SBC, can be deployed at the edge of a local network such as a Voice Over Internet Protocol, VoIP, network, typically on the boundary with a wide area network such as the internet. The SBC protects the local network by policing communication sessions such as voice calls (or 'VoIP calls') flowing into or out of the local network.

Communication sessions such as voice calls are commonly set up using call signaling messages. The call signaling messages follow a call signaling path often spanning a plurality of network nodes including one or more intermediate network devices, such as SBCs and soft-switches, and at least two endpoint devices, such as user terminals. In some cases, the user data of the call session (voice, video or other media exchanged after call setup) can follow the same path as the call signaling path.

Call signaling messages are commonly messages formatted according to a standardised call signaling protocol such as the Session Initiation Protocol, SIP. An SBC can process inbound call signaling messages to, for example, strip out sensitive information to protect user identities or network topologies, or to normalise the addressing information in messages so that they are understood by other network nodes.

As well as processing the call signaling messages that flow in and out of the VoIP network along the signaling path, the SBC can also create secondary control messages to servers away from the signaling path, for example to billing servers, authentication servers or policy control servers.

SUMMARY

According to first embodiments, there is provided a method of processing messages in a network node in a telecommunications network, the method comprising in the network node:
  receiving, via a first communication protocol input interface, a series of input messages formatted according to a first communication protocol, each input message comprising a plurality of message components;
  processing the input messages in a given message manipulation function according to a first set of user-programmable message processing rules operating on the message components to generate a series of processed messages based on the series of input messages, wherein the processing also generates processed data from a selected input message of the series of input messages according to the first set of user-programmable message processing rules;
  transmitting, via a first communication protocol output interface, a series of primary output messages based on the series of processed messages formatted according to the first communication protocol; and
  processing a secondary output message formatted according to a second communication protocol according to a second set of user-programmable message processing rules depending on the processed data from the selected input message.

According to second embodiments, there is provided a method of programming message processing rules in a network node, the method comprising:
  receiving, via a user interface from a user of the network node, a first set of rules for processing a series of input messages in a first message processing function associated with a first communication protocol, the first set of rules being operable to modify the series of input messages formatted according to the first communication protocol, the first set of rules including a rule to make content from a selected input message of the series of input messages available to another message manipulation function; and
  receiving, via a user interface from the user of the network node, a second set of rules, the second set of rules being operable to process an output message formatted according to a second communication protocol, the second set of rules including a rule to use the content from the selected input message, made available by the first message manipulation function, in the processing of the output message.

According to third embodiments, there is provided a method of processing messages in a session border controller in a telecommunications network, the method comprising:
  receiving, via a Session Initiation Protocol input interface, a series of input messages formatted according to the Session Initiation Protocol, the input messages comprising a plurality of Session Initiation Protocol header fields;
  processing the input messages in a Session Initiation Protocol message manipulation function according to a first set of user-programmable message processing rules operating on the Session Initiation Protocol header fields to generate a series of processed Session Initiation Protocol messages based on the series of input messages, wherein the processing also generates processed data from a selected input message of the series of input messages according to the first set of user-programmable message processing rules;
  transmitting, via a Session Initiation Protocol output interface, a series of Session Initiation Protocol output messages based on the series of processed Session Initiation Protocol messages formatted according to the Session Initiation Protocol; and
  processing a Diameter communication protocol output message formatted according to a Diameter communication protocol according to a second set of user-programmable message processing rules depending on the processed data from the selected input message.

According to fourth embodiments, there is provided a computer program arranged to perform a method according to the first, second, or third embodiments.

According to fifth embodiments, there is provided a network node configured to perform a method according to the first, second, or third embodiments.

Further features will become apparent from the following description, given by way of example only, which is made with reference to the accompanying drawings.

BRIEF DESCRIPTION OF THE DRAWINGS

FIG. 8 shows a schematic diagram of an example of a SIP call setup message in accordance with embodiments.

DETAILED DESCRIPTION

Application Gateway Device

Figure 1:
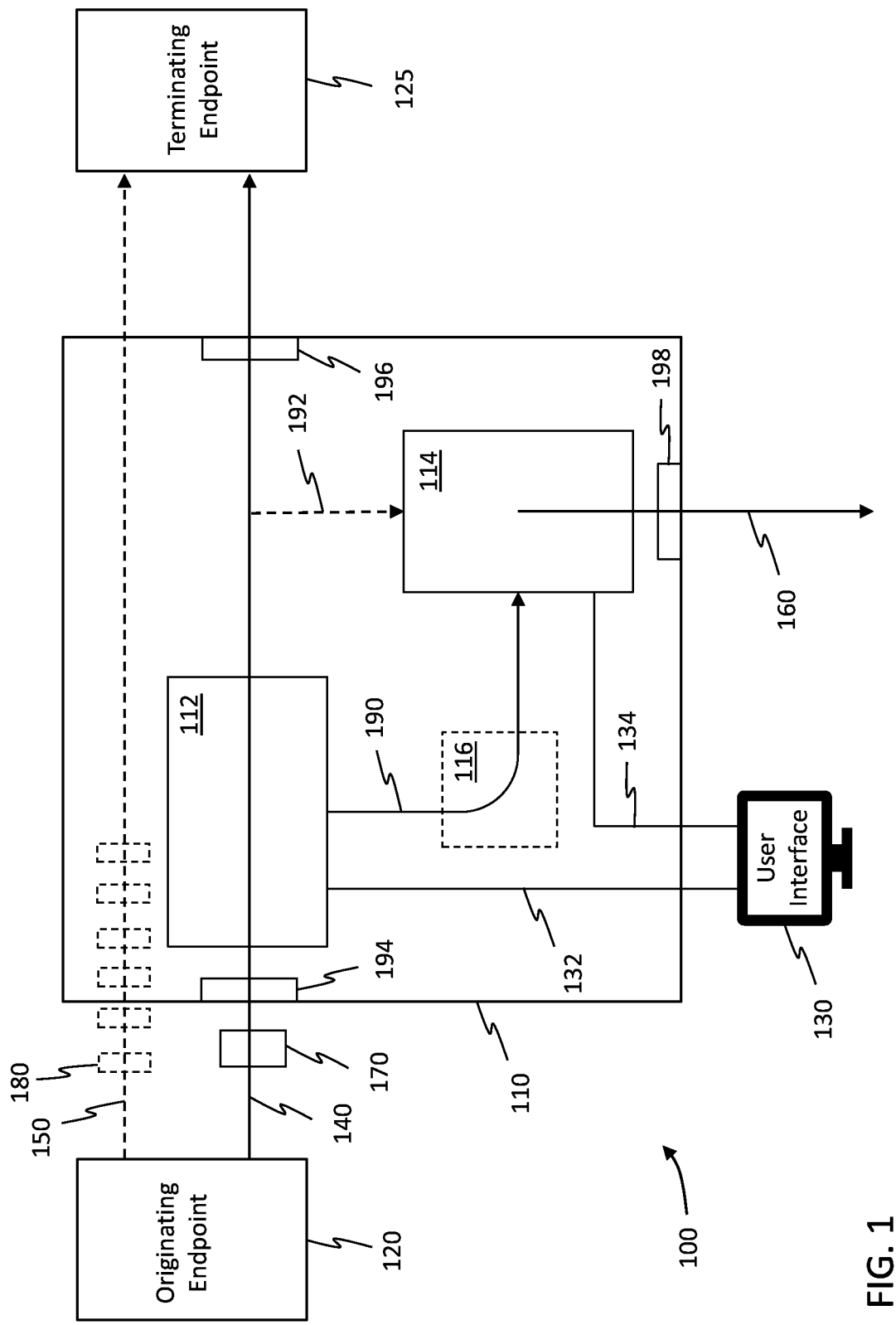
FIG. 1 shows a schematic diagram of an example of an application gateway device in a telecommunications network system in accordance with embodiments.

Referring to FIG. 1, there is shown schematically an example of an application gateway device 110 in a telecommunications network system 100.

The application gateway device 110 comprises an input interface 194 that operates according a first communication protocol. The input interface 194 is designed to receive input messages configured according to the first communication protocol. If the received messages do not comply with at least some basic aspects of the first communication protocol, then they may be excluded if a parsing function is included in the input interface 194. The gateway device 110 also comprises a primary output interface 196 that operates according to the first communication protocol, and a secondary output interface 198 that operates according to a different second communication protocol. The input and primary output interfaces 194, 196 allow messages of the first communication protocol sent between network devices in the telecommunications network system 100 to pass through the application gateway device 110.

The application gateway device 110 includes a message manipulation function 112 which is coupled to the input interface 194. The message manipulation function 112 operates according to the first communication protocol. The message manipulation function 112 is user-programmable, allowing a user to program or re-program the function when the gateway device is operational or when the gateway device is first deployed in the telecommunications network system. In particular, the message manipulation function 112 operates under the control of a first set of user-programmable message processing rules. The message processing rules can be written in a scripting language which allows them to be easily understood by a user when configuring the gateway device 110.

Input messages received over the input interface 194 are processed by the message manipulation function 112. The rules determine how each message is processed. The message manipulation function 112 under the operation of the rules examines the input message and results in the input message being blocked, modified or unmodified. Modified and unmodified messages are sent on from the message manipulation function 112 as processed messages, and may be further processed by other functions in the gateway device 110, before being transmitted as primary output messages over the primary output interface 196.

The input messages are received as a series of input messages from which a series of processed messages are generated. If input messages are blocked and discarded in the message manipulation function 112 then the series of processed messages will be based on a subset of the series of input messages. At the primary output interface, a series of primary output messages are transmitted based on the series of processed messages.

The message manipulation function 112 under the operation of the user-programmable message processing rules examines or analyses each input message. Each input message is composed of a series of message components. The messages components can, for example, be a header and a body of the input message. The message components can also, for example, be fields or sub-fields in the input message, and the fields can, for example, be header fields and/or body fields. In particular the fields or sub-fields can be formatted according to the first communication protocol.

The processing rules can examine or analyse individual components (e.g. headers/bodies/fields/sub-fields) of the input message in a flexible and programmable manner Rule operations include matching the contents of an individual component with a known content value in the rule such as a text or numeric value, or matching the contents with a range of values in the rule. For text-based matching, wild cards can be used to match a range of text. Rule operations can also include detecting and analysing the presence, length and/or order of an individual component in an input message. The rules can include criteria so that when components of an input message are examined, the rules can determine whether the criteria are met or not. The criteria can be based on examination of one or a plurality of components of the input message. The criteria can be used to determine whether a particular input message is modified, left unmodified, or blocked in the message manipulation function 112.

If a message is to be modified then the rules can specify how the message is modified in a flexible and programmable manner Modifications can include inserting new content defined in the rules into a message component (e.g. headers/bodies/fields/sub-fields), and/or replacing existing content of a message component with new content. Modifications can also include deleting content from a message component or deleting a message component in its entirety. The modifications can depend on information determined in the examination phase. For example, if a "From" field in an input message contains the name "James" then the subject field can be appended with the complete entry from the "From" field.

Apart from modifying the input message, the processing rules can also generate processed data from selected input messages. The input messages can be selected using the examine and analyse framework discussed above for matching text or numeric values in message components, or determining the existence, length, or order of certain message components, together with criteria for when a message is or is not selected.

The processed data can be generated by copying content from one or more input message components. The content to be copied can depend on information determined in the examination or analysis of the input message. For example, if a "To" field in an input message contains the name "Bill" then copy the content of the "Subject" field as the processed data. The processed data can also be generated by deriving content from one or more input message components. For example, if a "To" field in an input message contains the name "Bill" then copy the length of the "To" and "From" fields as an integer value in the processed data. The processed data can also be a generic action such as creating or proposing the creation of a message in another function in the gateway device. The processed data can be formatted as one or more fields with combinations of content, derived content, flags, or actions.

Because the analysis, criteria, and manipulation of message components according to the first communication protocol is similar between generating the processed messages and generating processed data for selected input messages, a common programming framework can advantageously be used for both in the message manipulation function 112. A user can more easily adapt or extend a set of rules for modifying input messages according to a first communication protocol, to generating processed data for selected input messages since the rule formats and the message components will be familiar to the user. Furthermore, the rules can more easily be adapted when new versions are made available for the first communication protocol.

A user can be provided with a user interface 130 such as a personal computer for writing or editing the first set of user-programmable rules for the message manipulation function 112. The rules can be written locally on the user interface 130 and uploaded to the message manipulation function 112 via the communication link 132. If there are rules that require modifying, then the rules can be downloaded over the communication link 132 before being edited and uploaded again to the message manipulation function 112. Alternatively, the user interface may be a terminal coupled to the message manipulation function 112 via the communication link 132 for writing or editing the directly within the message manipulation function 112.

The gateway device 110 includes a secondary message function 114 which is coupled to the secondary output interface 198. The processed data of selected input messages generated by the message manipulation function 112 is made available (or exposed), via a logical communication 190, to the secondary message function 114. In one example, the processed data can be made available by a temporary storage function 116 which can be written to by the message manipulation function 112 and read by the secondary message function 114.

The secondary message function 114 operates according to the second communication protocol. The secondary message function 114 is user-programmable, allowing a user to program or re-program the function when the gateway device is operational or when the gateway device is first deployed in the telecommunications network system. In particular, the secondary message function 114 operates under the control of a second set of user-programmable message processing rules. The message processing rules can be written in a scripting language which allows them to be easily understood by a user when configuring the gateway device 110.

The user interface 130 such as a personal computer enables a user to write or edit the second set of user-programmable rules for the secondary message function 114. The rules can be written locally on the user interface 130 and uploaded to the secondary message function 114 via the communication link 134. If there are rules that require modifying, then the rules can be downloaded over the communication link 134 before being edited and uploaded again to the secondary message function 114. Alternatively, the user interface may be a terminal coupled to the secondary message function 114 via the communication link 134 for writing or editing the directly within the secondary message function 114.

The second set of user-programmable rules ("second rules") for the secondary message function 114 includes rules that use the processed data generated by the message manipulation function 112 to create and/or modify messages according to the second communication protocol.

In an example function of the secondary message function 114, the second rules can create a secondary output message according to the secondary protocol based on the processed data. As described above, the processed data can be a proposal to create a message in another function. Hence a rule can be made to create, in response to a proposal to create a message from the processed data, a new secondary output message according to the secondary protocol. Alternatively, the second rules can include a rule to create a new secondary output message when certain content exists in the processed data such as particular text values or numeric values, or when there is a particular combination of fields identified in the processed data.

In an example, the gateway device 110 includes further processing operations (not shown) that operate on the processed messages generated by the message manipulation function 112. These further processing operations are not user configurable and can, in response to a particular type of processed message, create a secondary message 192 in accordance with a second communication protocol for output over the secondary output interface 198. In this case, the secondary message function 114 will process the secondary message 192 according to the second rules. In particular, the secondary message 192 will be processed by the second rules using the processed data from the input message. The second rules are flexible and adaptive in the way they can use the processed data. For example, the processed data can be used in the analysis part of a rule to examine the content of the secondary message 192 based on the processed data. In this example, the rule could look for a match between the contents of a component (e.g. headers/bodies/fields/sub-fields) in the secondary message with the content of the processed data. In another example, the processed data can be inserted into the secondary message as a free text field in the body of the message.

In an example, the gateway device 110 creates a secondary message without application of the second rules, for example based on the processed data, but the secondary message function 114 will nevertheless process the secondary message 192 according to the second rules. In particular, the secondary message 192 will be processed by the second rules using the processed data from the input message. The second rules are flexible and adaptive in the way they can use the processed data. For example, the processed data can be used in the analysis part of a rule to examine the content of the secondary message 192 based on the processed data.

In this example, the rule could look for a match between the contents of a component (e.g. headers/bodies/fields/subfields) in the secondary message with the content of the processed data. In another example, the processed data can be inserted into the secondary message as a free text field in the body of the message.

Figure 2:
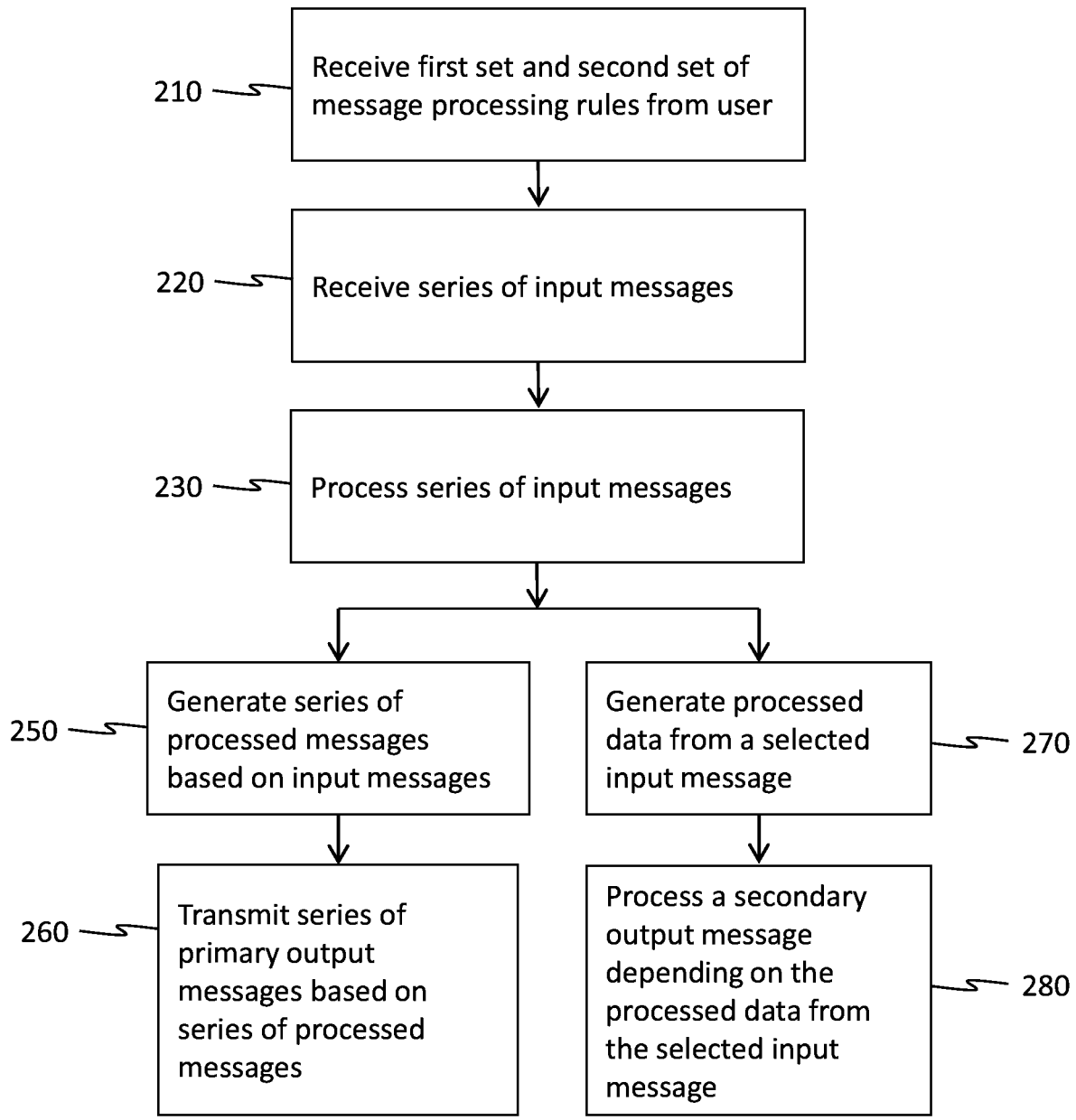
FIG. 2 shows a flow diagram of an example of a method in an application gateway in accordance with embodiments.

The methods used in the application gateway device 110 are set out generally by way of example in the flowchart of FIG. 2. In block 210, the first and second sets of message processing rules used by the message manipulation function 112 and secondary message function 114 are received from a user (for example via the user interface 130). In block 220, the gateway device 110 receives a series of input messages formatted according to a first communication protocol. In block 230, the received series of input messages are processed by the message manipulation function 112 under the control of the first set of rules. The processing block 230 leads to two branched blocks 250 and 270. In block 250, the processing of the series of input messages generates a series of processed messages based in the input messages which are formatted according to the first communication protocol. In block 260, the gateway device transmits primary output messages based in the series of processed messages. In block 270, the processing of the series of input message generates processed data from a selected input message. Finally, in block 280, the gateway device processes a secondary output message depending on the processed data of the selected input message.

Call Signaling

The functions and methods described above with reference to FIG. 1 are particularly suited to a call signaling example. In this example, the telecommunications network system 100 of FIG. 1 provides call services to subscribers using endpoint devices 120, 125. For example, subscribers may be able to use the telecommunications network system 100 to make call sessions such as telephone calls between endpoints 120, 125. In this example, a call session is initiated at an originating endpoint 120 (under the control of a calling party/subscriber) and terminates at a terminating endpoint 125 (the called party/subscriber). The call session is initiated over a call signaling path 140 by the originating endpoint 120 generating and transmitting a call initiation message 170. The call signaling path 140 passes through the application gateway device 110 (which in this example may be referred to as a call control gateway device), and can also pass through other intermediate network nodes (not shown) that assist in routing the call initiation message 170 to its destination at the terminating endpoint 125.

The call signaling path is illustrated in FIG. 1 by an arrow indicating the direction from the originating endpoint 120 to the terminating endpoint 125. This arrow reflects the direction in which the call was initiated. Since call sessions are established by exchange of call signaling messages in both directions, there is also a complementary reverse signaling path that extends from the terminating endpoint 125 through the application gateway device 110 and the intermediate network nodes (not shown) to the originating endpoint device 120. A call initiation message 170 received at the terminating endpoint 125 can be acknowledged by a call signaling message generated at the terminating endpoint 125 and sent in the reverse direction along the call signaling path 140. In order for a call session to be established, further call signaling messages may be exchanged along the call signaling path 140 and the reverse call signaling path.

The call session establishment sets up a new data communication path 150 that can be used to transmit user data in the form of real-time streamed media such as audio and video from the originating endpoint 120 to the terminating endpoint 125. For example, an audio stream generated at the originating endpoint will typically be sent as regularly spaced-in-time data messages 180. As call sessions are typically bidirectional, a data communication path will also be established in the reverse direction from the terminating endpoint 125 to the originating endpoint 120. The reverse data communication path can be used to transmit or stream audio and video or other user data from the terminating endpoint to the originating endpoint using appropriate data messages.

During a call session, it may be beneficial to modify the session, for example, to change the quality of the audio stream or to add or remove data streams. This can be achieved by sending an appropriate call signaling message over the call signaling path 140. At the end of a call session, either subscriber (the calling party or the called party) may terminate the call by sending an appropriate call signaling message over the call signaling path 140 or over the reverse call signaling path.

The call signaling path is used by call signaling messages to control call sessions by initiating, modifying, and terminating call sessions. Hence, the call signaling path and the call signaling messages can together be referred to as the control plane for call sessions. In contrast, the data communication path is used predominantly for sending user data and can be referred to as the user plane. The control plane and the user plane handle different types of messages and have different performance criteria and are therefore supported by different communication protocols as will be described in more detail later.

Using the methods described above, the application gateway device 110 can advantageously be used to control the call signaling messages passing through the device.

For example, if the user of the gateway device is a service provider and the originating endpoint 120 sends malicious call signaling messages 170 in an attempt to hack the service provider's network or to by-pass certain policies or billing events, the user can configure a message processing rule for the message manipulation function 112 that can detect and block such messages from entering further in the device or the service provider's network. In this case, if the blocking rule is based on an originating address field in the message then it may be beneficial to record certain metadata for all the instances when the messages are received and blocked. In this case, a rule can be created by the user not only to block messages with an address field that matches an address field identified in the rule, but to generate some processed data based on that message. The processed data could be certain header fields extracted from the message, an identifier to indicate that the processed data relates to particular endpoint attack, together with a trigger to generate a message in another function in the gateway device. The user can then edit the rules for the secondary processing function to generate a rule that creates a message according to a different communication protocol such as an authentication, authorisation and accounting protocol based on the trigger in the processed data. Alternatively, the message according to the different communication protocol can be created directly by the trigger but then modified based on the processed data using the second rules. The secondary processing function, having access to the processed data, and under the control of the rule, will generate a secondary output message addressed to a suitable server, and formatted to include the contents of the header fields extracted from the input call signaling message and the identifier.

Figure 3:
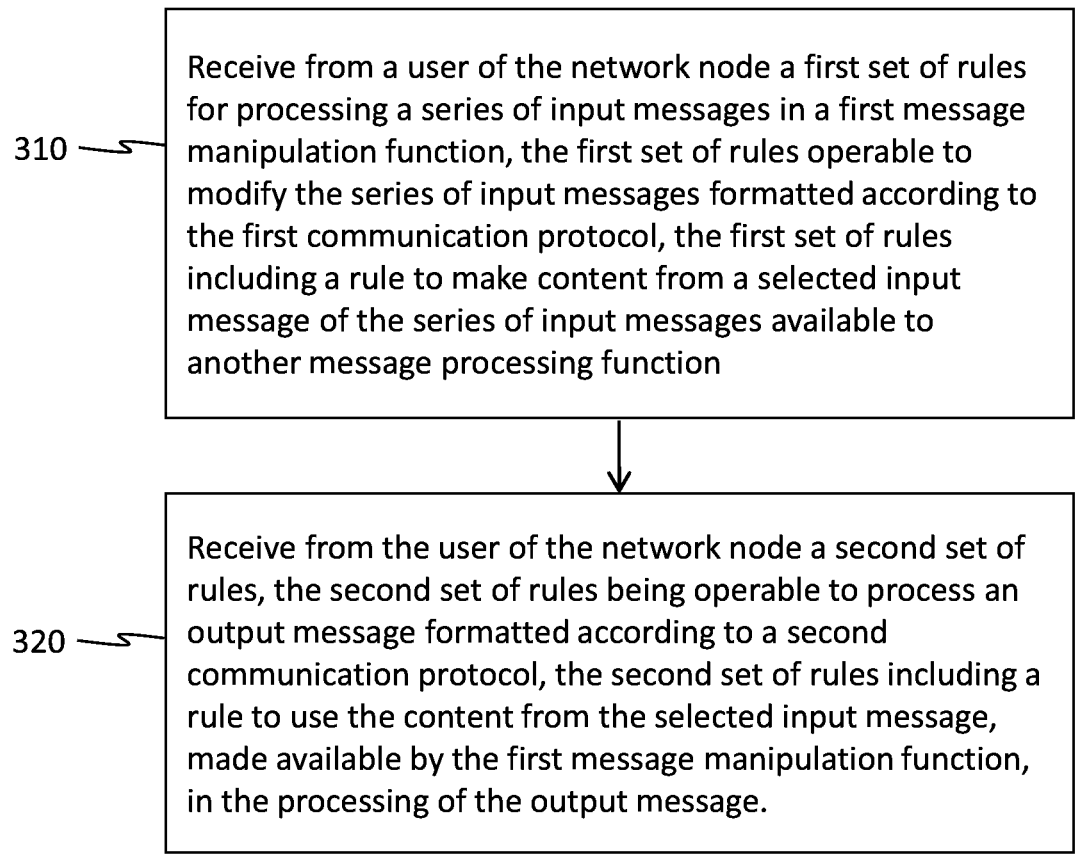
FIG. 3 shows a flow diagram of an example of a method in an application gateway in accordance with embodiments.

This approach to configuring the message processing rules is set out generally in the flowchart of FIG. 3. In block 310 of the flowchart, the gateway device receives from the user of the gateway device a first set of rules for processing a series of input messages in the message manipulation function 112, the first set of rules operable to modify the series of input messages formatted according to the first communication protocol, the first set of rules including a rule to make content from a selected input message of the series of input messages available to another message processing function. In block 320, the gateway device receives from the user of the gateway device a second set of rules, the second set of rules being operable to process an output message formatted according to a second communication protocol, the second set of rules including a rule to use the content from the selected input message, made available by the first message manipulation function, in the processing of the output message.

Session Border Controller

Figure 4:
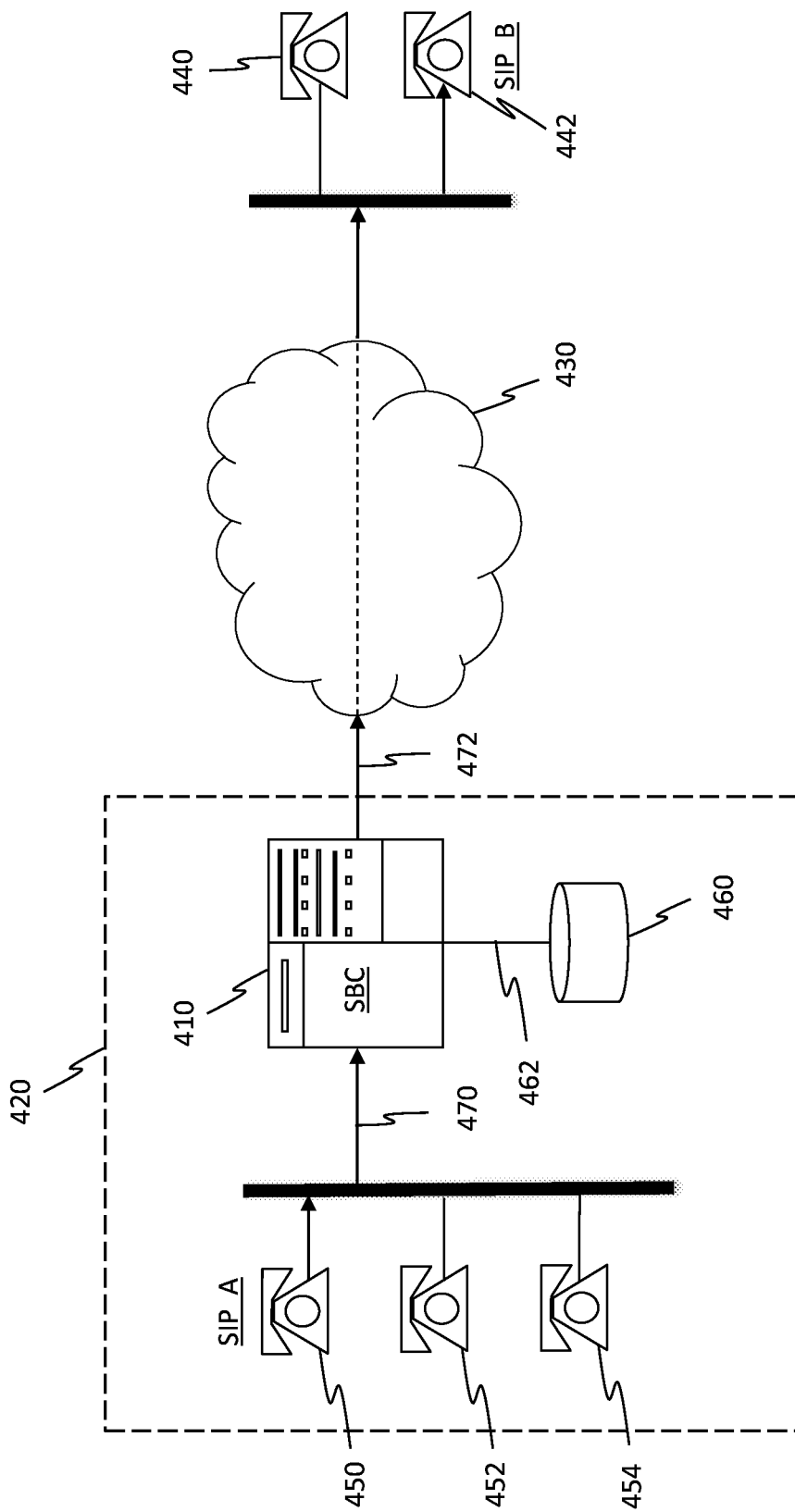
FIG. 4 shows a schematic diagram of an example of a Session Border Controller in a telecommunications network system in accordance with embodiments.

Referring to FIG. 4, there is shown schematically an example of a Session Border Controller, SBC, 410 in a telecommunications network system 400. In an example, the telecommunications network system 400 comprises a local network 420 such as a Voice Over Internet Protocol, VoIP, network, and a wide area network 430 such as the internet. The VoIP clients 450, 452, and 454 are provided in the local network 420 which can communicate with each other in the local domain, and can communicate with remote VoIP clients 440, 442 via the internet 430.

The local and wide area networks are packet-based telecommunications networks. The SBC 410 is deployed at the logical edge of the local network 420 on the boundary between the local network 420 and the wide area network 430. The SBC 410 acts as an application gateway device functioning according to the gateway device of FIG. 1. The SBC 410 protects the local network 420 by policing communication sessions such as voice calls (or 'VoIP calls') flowing into or out of the local network 420.

Communication sessions such as voice calls between the VoIP clients 450, 452, 454 and the VoIP clients 440, 442 will pass through the SBC 410. These voice calls are set up using call signaling messages. The call signaling messages follow a call signaling path often spanning a plurality of network nodes including one or more intermediate network devices and the SBC 410. In this example, the user data of the call session (voice, video or other media exchanged after call setup) follows the same path as the call signaling path through the SBC 410.

The call signaling messages in this example are formatted according to a standardised call signaling protocol, for example, the Session Initiation Protocol, SIP defined by the Internet Engineering Task Force, IETF in standards document RFC3261. The SBC 410 can process inbound call signaling messages such as those received via the signal leg 470 to, for example, strip out sensitive information to protect user identities or network topologies, or to normalise the addressing information in messages so that they are understood by other network nodes downstream of the SBC 410.

As well as processing the call signaling messages that flow in and out of the VoIP network along the signaling path 470, 472, the SBC 410 can also create secondary control messages to servers away from the signaling path, for example to billing servers, authentication servers or policy control servers. FIG. 4 illustrates a server positioned away from the call signaling path which in this example is a policy control server 460. The SBC 410 communicates with the policy control server 460 over a communication link 462 using a different communication protocol from the call signaling protocol SIP used on the call signaling path. The communication protocol used in this example is the standardised Diameter protocol defined by the Internet Engineering Task Force, IETF in standards document RFC6733.

Figure 5:
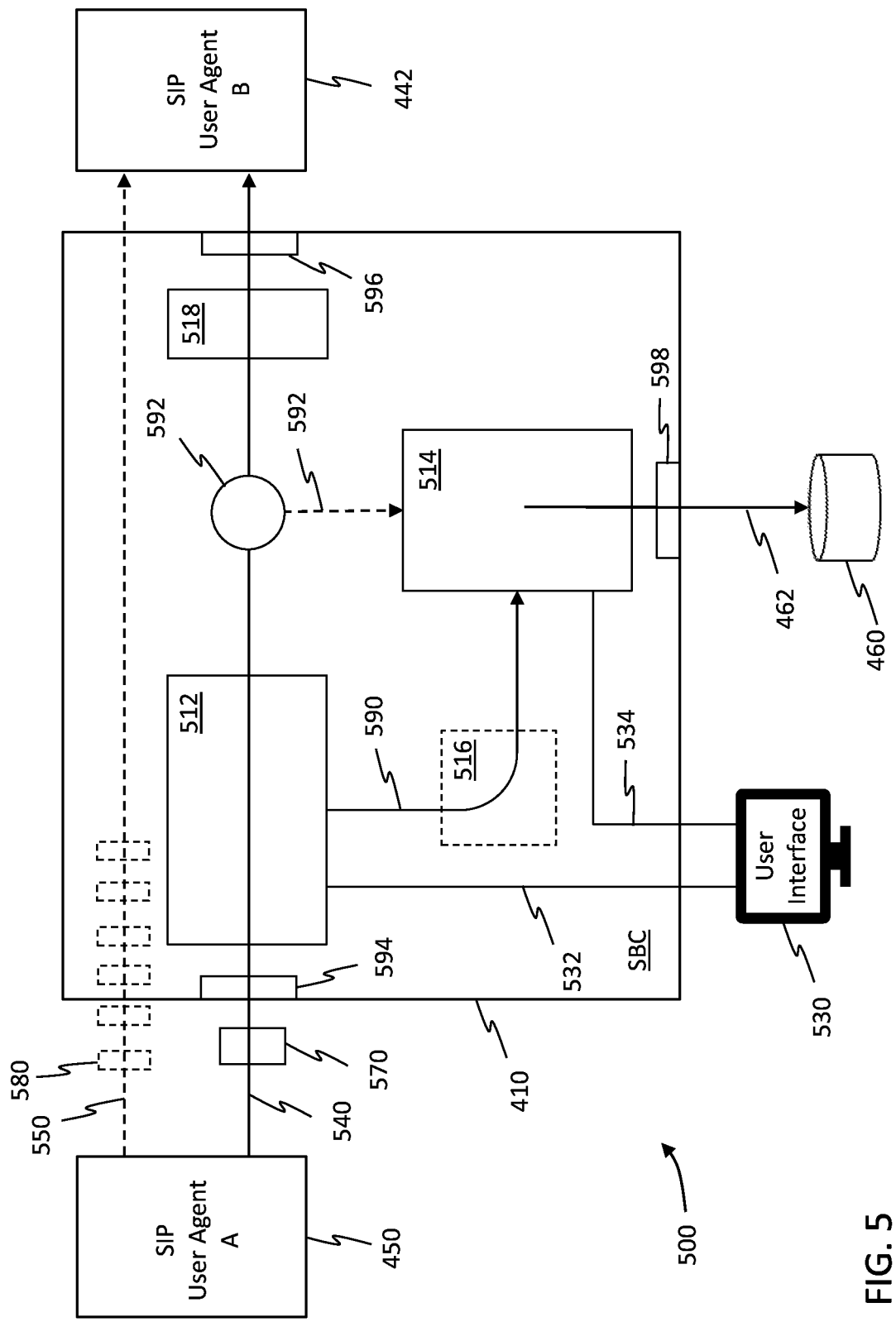
FIG. 5 shows a schematic diagram of an example of a Session Border Controller in accordance with embodiments.

FIG. 5 shows a more detailed view of the SBC 410 of FIG. 4 together with the VoIP clients 450 and 442 acting as SIP user agents A and B respectively, and the policy server 460. The last 2 digits of the labels in FIG. 5 correspond to the last 2 digits of the labels in FIG. 1 and each element of the SBC 410 in FIG. 5 provides a corresponding function to that performed by the gateway device in FIG. 1. Additionally, FIG. 5 illustrates the internal call message processing function in the SBC 410 as function 592. Furthermore, the SBC 410 includes a further SIP message manipulation function 518 located adjacent to the primary (SIP) output interface 596 of the SBC. The further message manipulation function 518 operates according to a set of user-programmable message processing rules and provides a final point of configurable control to a user over the call signaling messages that are output through the primary (SIP) output interface 596.

The SBC 410 operates as follows. Initially, the first set of SIP message processing rules used by the SIP message manipulation function 512 and the second set of Diameter message processing rules used by the secondary message function 514 are received from a user (for example via the user interface 530). In operation, the SBC 410 receives a series of SIP request or SIP response messages 570 formatted according to the SIP protocol via the SIP input interface 594. The SIP messages may be received from the SIP User Agent A 450 but may also be received from other SIP clients such as VoIP clients 452, 454 from FIG. 4. Next, the received series of SIP input messages are processed by the SIP message manipulation function 512 under the control of the first set of rules. The processing by the SIP message manipulation function 512 results in two generated outputs. Along the primary call signaling path, the processing of the series of SIP input messages generates a series of processed SIP messages based in the SIP input messages which are formatted according to the SIP protocol. After processing further by the internal call processing function 592 and the further SIP message manipulation function 518, the SBC transmits primary SIP output messages based in the series of processed messages. The other generated output from the SIP message manipulation function 512 is the processed data from selected SIP input messages. The processed data is exposed to the Diameter message processing function 514. The Diameter message processing function 514 creates or modifies Diameter output messages based on the second set of Diameter rules and depending on the processed data of the selected input messages. The Diameter output messages are transmitted over the secondary (Diameter) output interface 598.

SIP and Diameter Protocols

The SIP communication protocol and the Diameter communication protocol are both application control protocols, but they are used for different purpose, have different message formats, and typically operate with a different protocol stack. It is therefore beneficial to the customer that there are distinct message processing frameworks for each protocol with distinct sets of rules.

Figure 6:
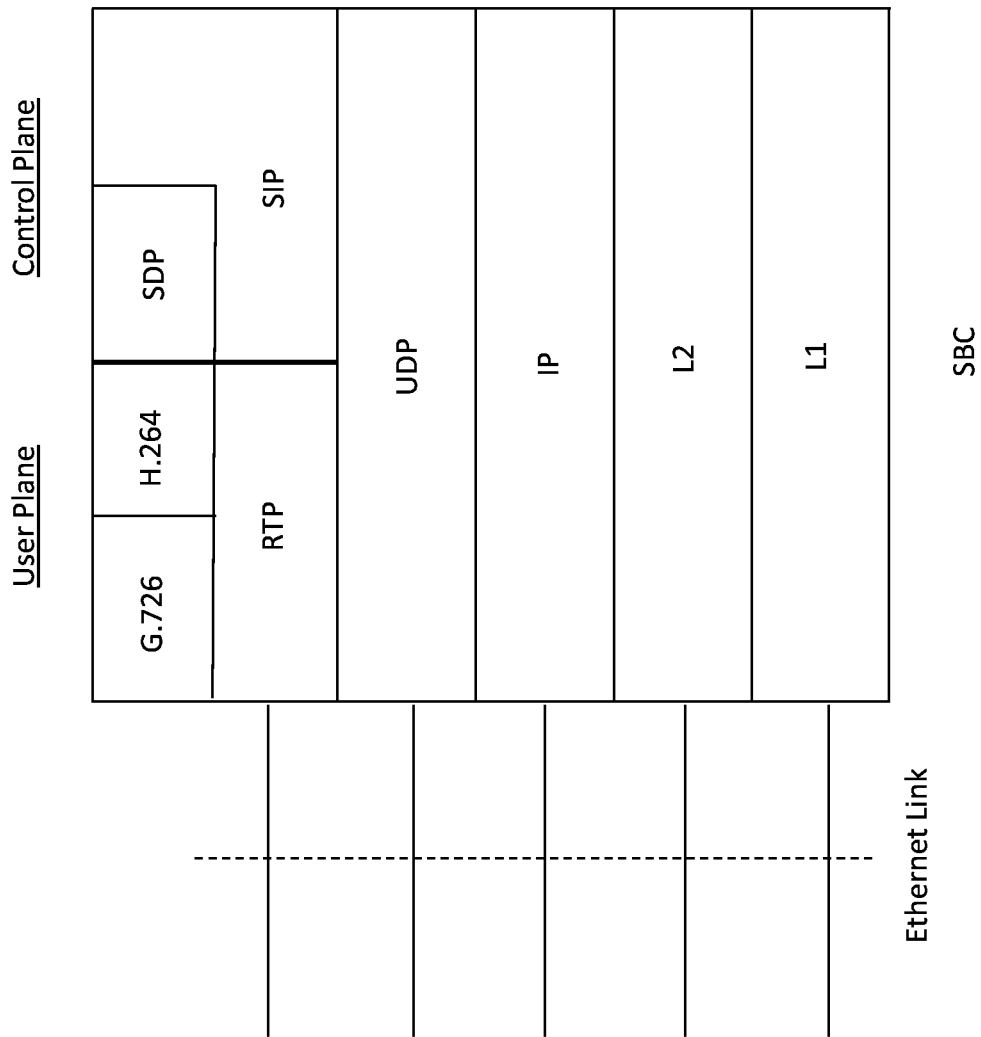
FIG. 6 shows a schematic diagram of an example of a protocol stack for call sessions in accordance with embodiments.

FIG. 6 illustrates an example protocol stack used for the SIP input interface 594 in FIG. 5. The interface uses an ethernet link which provides the link layers L1 and L2 for the received SIP signaling messages. Above the link layers are the internet layer provided by the IP protocol (IPv4 or IPv6), and the transport layer provided by the UDP protocol (User Datagram Protocol). Above the transport layer on the call signaling side (control plane) is the SIP application protocol which typically makes use of the session description protocol (SDP) for the SIP body (defined in RFC4566). For data signaling 550 in a call session (user plane), the layer above the UDP transport layer can be provided by the Real-time Transport Protocol (RTP), and above that are the containers for the audio and video codecs (G.726, H.264).

Figure 7:
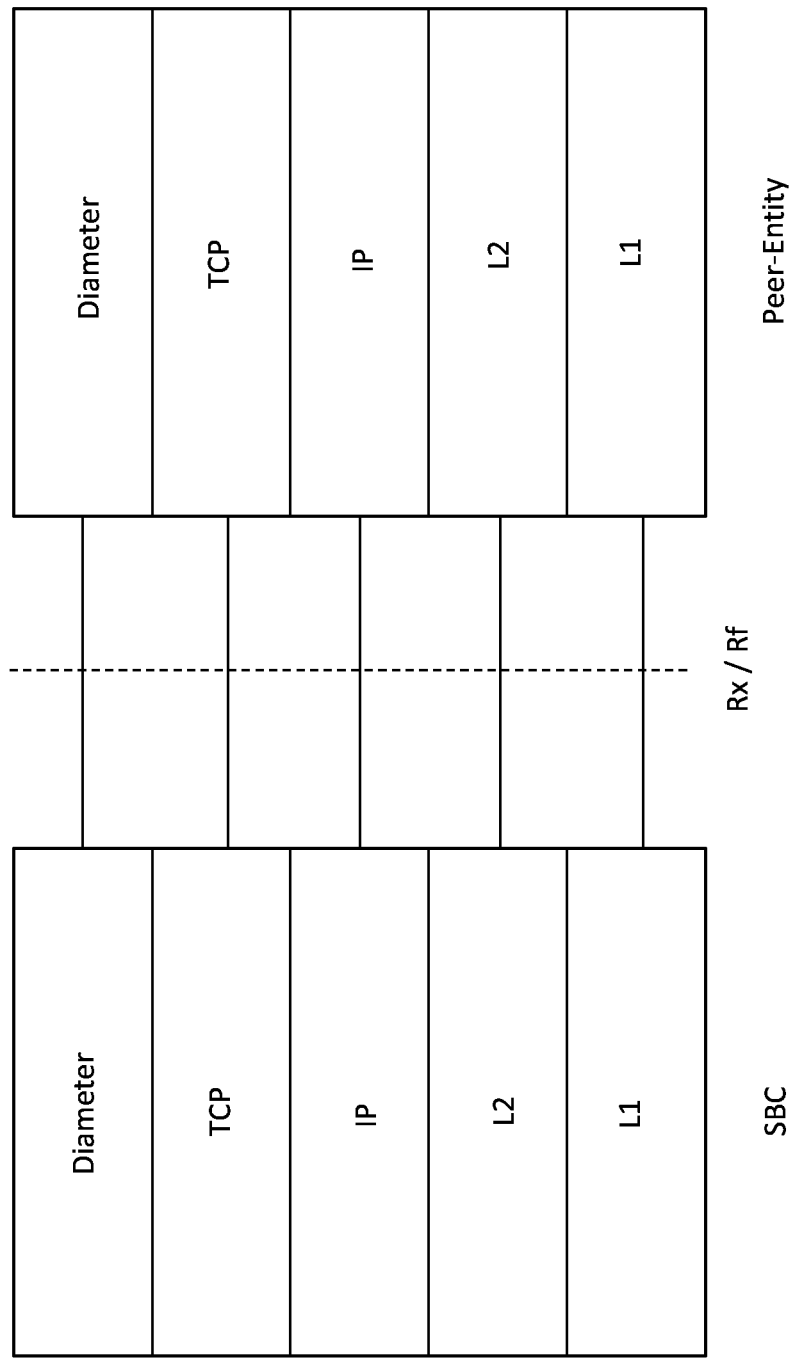
FIG. 7 shows a schematic diagram of an example of a protocol stack for an Rx or Rf interface in a telecommunications network system in accordance with embodiments.

FIG. 7 illustrates an example protocol stack used for the Diameter output interface 598 in FIG. 5 when linking to the policy server 460. Note that in the IMS system from the Third Generation Partnership (3GPP), the SBC can act as a Proxy Call Session Control Function (P-CSCF) which can link over the Rx Diameter interface to the policy server (PCRF), or over the Rf Diameter interface to the billing server (CDF). The Rx/Rf Diameter interface can also use an ethernet link to provides the link layers L1 and L2 for conveying the Diameter control messages. Above the link layers are the internet layer provided by the IP protocol (IPv4 or IPv6), and the transport layer provided by the TCP protocol (Transmission Control Protocol). The Diameter protocol itself sits in the application layer above the transport layer.

Message Processing Examples

The following example illustrates how a user or customer of a gateway device such as the SBC of FIG. 5 can configure the SIP message processing rules and the Diameter message processing rules employed in the gateway/SBC to provide a user-configured manipulation of SIP and Diameter messages Referring to FIG. 4, suppose that the SIP user agent/VoIP client 440 outside the local network 420 has particular SIP client software which sends SIP request messages that causes the SIP user agent/VoIP client 452 to crash. In order to resolve the error situation, the user of the SBC can write a rule to add to the SIP message processing rules using the user interface 530. The rule may look for the SIP messages coming from the SIP user agent/VoIP client 440 or preferably will look for SIP messages coming from the particular type of SIP client software.

The SIP client software may be identifiable in SIP messages by looking at the SIP header field "User-Agent".

FIG. 8 is an example of a SIP INVITE request message sent by the SIP user agent/VoIP client 440 with the problematic SIP client software. The SIP INVITE message is used for initiating a call session with another user agent. The SIP message includes a SIP Header and SIP Body. A number of SIP header fields are included in the message including addressing fields "To" and "From" as well as identifiers such as "Call-ID", and a field "Content-Type" indicating that the body of the SIP message is in the SDP format. The message also includes the field "User-Agent" with the entry "Malsip12345".

Therefore, it can be deduced that the problematic SIP client software is associated with the "User-Agent" header that starts with 'Malsip'.

In order to block SIP messages with the "User-Agent" header prefix 'Malsip', the customer writes a SIP message processing rule on the SBC as follows:
   header-profile drop-bad-user-agent-calls
   header User-Agent
   action drop-request
   condition advanced "(REGEX (msg.first-header(\"User-Agent\").value, 'Malsip.*'))"
The first line here defines a 'profile' (a grouping of editing rules), and gives them a name.

The second line states that this rule applies to the standardised SIP header named "User-Agent"

The third line lists the action to take if this rule matches with the SIP message. In this case, the message is blocked or dropped.

The fourth line lists the condition for the rule. If this condition matches for the SIP message, then the action is performed i.e. the message is dropped. The condition is satisfied if the value of the first User-Agent header in the message starts with the text 'Malsip'.

Now, the customer may want to alert users if there are a significant number of instances of the SIP messages from User Agent "Malsip" being processed by the SBC. This may be monitored by a separate server such as the policy server 460. Therefore, the customer may wish to notify each instance of the SIP messages from User Agent "Malsip" to the policy server 460 over the secondary interface, for example using the Rx interface and the Diameter protocol.

The customer can generate such as notification in this scenario by firstly modifying the SIP rules to expose the name of the User-Agent and to trigger the Diameter message on the Rx interface, and secondly by modifying the Diameter rules to insert the exposed name of the User-Agent as a component in the Diameter message. In one example, the exposed name can be added by adding an Attribute-Value Pair, AVP, to the Diameter message.

Figure 9:
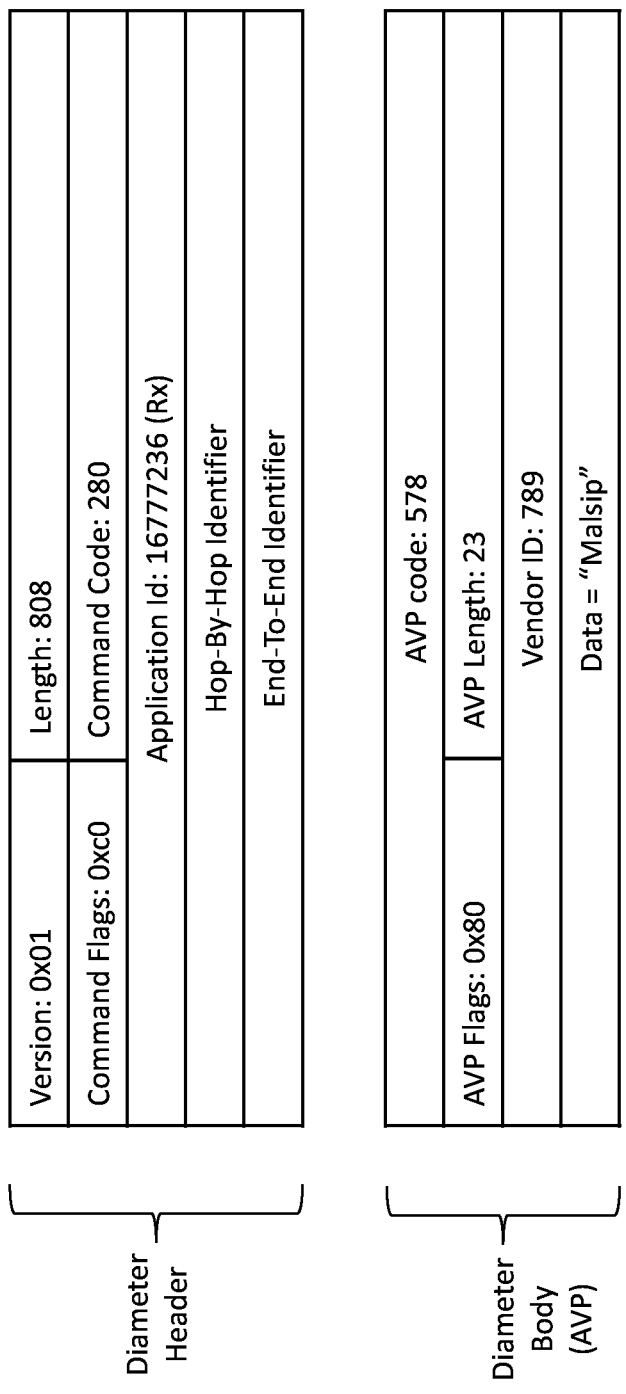
FIG. 9 shows a schematic diagram of an example of a Diameter message in accordance with embodiments.

FIG. 9 illustrates an example Diameter message created using the modified rules. The Diameter message includes a number of standardised header fields that may specify that the type of interface is Rx and type of message. The body of the Diameter message contains a single AVP with a number of headers such as AVP code 578 and vendor-id 789 which are used to identify the AVP. The data part of the AVP then contains the problematic User Agent name "Malsip".

In this example, the SIP rules would be modified by the customer to include the following rule:
   header-profile expose-user-agent-to-rx
   header User-Agent
   action store-diam-vars trigger-rx-lookup
   condition advanced "(REGEX (msg.first-header(\"User-Agent\").value, '(Malsip).*', useragentvalue))"
The first line again defines a new profile
The second line again marks that this applies to the User-Agent header
The third line says that the action to take if this rule matches is to expose any variables from this rule to diameter-based protocols (store-diam-vars), and to also trigger an Rx message to be sent out (trigger-rx-lookup)
The fourth rule defines the match condition—the same as in the SIP rule above, except this time, store the value of the user agent header in a variable named 'useragentvalue'.

The result of this is that if a SIP message has a User-Agent starting with 'Malsip', then an Rx message is generated by the system, and the Rx message processing rules for that message have access to a variable named 'useragentvalue'.

This is achieved in the above rule using a similar syntax to the syntax used to drop the SIP message. As such, a customer familiar with the syntax can define both rules without having to learn a completely new syntax.

The Diameter rules would then be modified by the customer to include the following rule to modify the created Diameter message:
   rx
   message-manipulation
   profile send-user-agent-over-rx
   avp 578 vendor-id 789 add type octetstring variable useragentvalue The first two lines indicate this rule is a configuration for Rx Diameter message manipulation.

The third line starts a profile for the rule and names it.

The fourth line defines the rule, which is "add an AVP with the AVP code 578 and Vendor ID 789, which contains a string, and give that string the value of the variable 'useragentvalue'. Note that if the variable 'useragentvalue' was not set—i.e. the SIP message manipulation rule did not match—then this Rx editing rule would do nothing.

In summary, this gives an example of how users can write SIP message processing rules that store values with a name, and then write Rx Diameter message processing rules that reference those values again by name to apply specific edits to Rx Diameter messages based on the contents of selected SIP messages.

Other examples for use of the messaging procedures set out above are as follows:

1. A promotion may be offered to subscribers using particular SIP software clients. This can be configured in the SBC by identifying the SIP messages coming from subscribers with the SIP software client through use of the "User-Agent" field described above. If there is a match for those subscriber's SIP messages then a secondary output message can be delivered to the billing server over an Rf Diameter interface, for example. This can be implemented by configuring the SIP rules to detect the SIP messages with the matching User Agent for the promotion, and expose the originator field of the SIP message to the Rf Diameter message processing function. The Rf Diameter rules can then be configured to create a billing message based on the originator field to the billing server to indicate that a discount should be applied to the call. Alternatively, if the SBC internal call processing function 592 automatically sends a billing message, then this billing message can be manipulated by the Rf Diameter rules to indicate that a lower tariff should be applied.

2. A promotion may be offered by company to provide free calls if a brand name is included in the subject field of the SIP message. This can be configured in the SBC by identifying the SIP messages coming from subscribers with the SIP subject header containing the brand name. If there is a match for those subscriber's SIP messages then a secondary output message can be delivered to the billing server over an Rf Diameter interface, for example. This can be implemented by configuring the SIP rules to detect only the SIP messages with the matching brand name in the subject field, and expose the content of the SIP From field of the SIP message to the Rf Diameter message processing function. The Rf Diameter rules can then be configured to create a billing message based on the content of the SIP From field to the billing server to indicate that the call should be free. Alternatively, if the SBC internal call processing function 592 automatically sends a billing message, then this billing message can be manipulated by the Rf Diameter rules to indicate that call should be free.

Non-Limiting Additional Implementation Details

Examples described herein may be implemented in a virtualisation platform, for example an OpenStack® or VMware® environment, in which a network node, gateway device or session border controller may be implemented as software instantiated on virtual machines. Alternative examples are implemented in non-virtualized environments or public cloud infrastructure, for example Amazon Web Services (AWS)®.

Although at least some aspects of the examples described herein with reference to the drawings comprise computer processes e.g. in the form of processing functions, agents or scripts, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary examples. In this regard, the exemplary examples may be implemented at least in part by computer software stored in (non-transitory) memory and executable by the processor, or by hardware, or by a combination of tangibly stored software and hardware (and tangibly stored firmware).

The above examples are to be understood as illustrative examples of the invention. Further examples of the invention are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing messages by a Session Border Controller (SBC) in a telecommunications network, the method comprising:

receiving, via a Session Initiation Protocol (SIP) input interface of the SBC, input messages formatted according to SIP, the input messages comprising a plurality of SIP header fields, the SBC comprising a SIP message manipulation function configured with a first set of user-programmable message processing rules;

based on the first set of user-programmable message processing rules, processing the SIP header fields of the input messages by the SIP message manipulation function to generate processed input messages;

transmitting, via a SIP output interface of the SBC, primary output messages based on the processed input messages, the primary output messages formatted according to SIP;

inputting a selected primary output message to a secondary message function of the SBC, the secondary message function comprising a second set of user-programmable message processing rules; and based on the second set of user-programmable message processing rules, processing, by the secondary message function, the selected primary output message to generate, by the secondary message function, a secondary output message formatted according to a second communication protocol, wherein the second communication protocol is different from the SIP protocol.

2. The method according to claim 1, wherein the second communication protocol is an authentication, authorization, and/or accounting control protocol.

3. The method according to claim 1, wherein the method comprises creating the secondary output message in response to receipt of the selected input message, and wherein the processing of the secondary output message is performed in a further message manipulation function.

4. The method according to claim 1, further comprising generating processed data from a selected input message of the input messages according to the first set of user-programmable message processing rules, wherein the processing of the secondary output message comprises creating the secondary output message based on the processed data.

5. The method according to claim 1, wherein processing the input messages comprises blocking some input messages according to the first set of user-programmable message processing rules such that the processed messages is based on a subset of the input messages.

6. The method according to claim 1, wherein of processed messages comprises modified messages and unmodified messages from of input messages.

7. The method according to claim 1, further comprising transmitting, via a second communication protocol output interface, the secondary output message formatted according to the second communication protocol.

8. The method according to claim 1, further comprising receiving, via a user interface prior to receiving the input messages, the first set of user-programmable message processing rules and the second set of user-programmable message processing rules.

9. The method according to claim 1, wherein the first or second set of user-programmable message processing rules are programmable using a scripting language.

10. The method according to claim 1, further comprising generating processed data from a selected input message of the input messages according to the first set of user-programmable message processing rules, wherein the processed data comprises message content copied from an input message component.

11. The method according to claim 1, further comprising generating processed data from a selected input message of the input messages according to the first set of user-programmable message processing rules, wherein the processed data comprises message content derived from one or more input message components.

12. The method according to claim 1, wherein said second set of user-programmable message processing rules inserts message content into the output message.

13. The method according to claim 1, further comprising generating processed data from a selected input message of the input messages according to the first set of user-programmable message processing rules, wherein the processed data comprises an action command derived from one or more input message components.

14. The method according to claim 1, wherein said first set of user-programmable message processing rules operating on the SIP header fields of the input message comprises a rule for matching content in a message component of the input message with a user-programmed content value defined in the first set of user-programmable message processing rules.

15. The method according to claim 1, wherein said first set of user-programmable message processing rules operating on the SIP header fields of the input message comprises a rule for inserting content in a message component of the input message with a user-programmed content value defined in the first set of user-programmable message processing rules.

16. The method according to claim 1, wherein said first set of user-programmable message processing rules operating on the SIP header fields of the input message comprises a rule for replacing content in a message component of the input message with a user-programmed content value defined in the first set of user-programmable message processing rules.

17. A computer-readable storage medium having computer-executable instructions stored thereupon which, when executed by one or more processors of a computing device, cause the computing device to perform operations comprising:

receiving, via a Session Initiation Protocol input interface, input messages formatted according to the Session Initiation Protocol, the input messages comprising a plurality of Session Initiation Protocol header fields;

based on a Session Initiation Protocol message manipulation function configured with user-programmable message processing rules, processing Session Initiation Protocol header fields of the input messages by the Session Initiation Protocol message manipulation function to generate processed input Session Initiation Protocol messages;

transmitting, via a Session Initiation Protocol output interface, Session Initiation Protocol output messages based on of processed Session Initiation Protocol input messages, the output messages formatted according to the Session Initiation Protocol;

inputting a selected Session Initiation Protocol output message to a secondary message function, the secondary message function comprising a second set of user-programmable message processing rules;

based on the second set of user-programmable message processing rules, processing, by the secondary message function, the selected Session Initiation Protocol output message; and generating, by the secondary message function, a secondary output message formatted according to the Diameter communication protocol.

18. A system for processing messages in a network node in a telecommunications network, the system comprising one or more processors and a memory in communication with the one or more processors, the memory having computer-readable instructions stored thereupon that, when executed by the one or more processors, cause the system to perform operations comprising:

receiving, via a Session Initiation Protocol (SIP) input interface, input messages formatted according to SIP, the input messages comprising a plurality of SIP header fields;

based on a SIP message manipulation function configured with user-programmable message processing rules, processing the SIP header fields of the input messages by the SIP message manipulation function to generate processed input messages;

transmitting, via a SIP output interface, primary output messages based on the processed input messages, the primary output messages formatted according to SIP;

inputting a selected primary output message to a secondary message function, the secondary message function comprising a second set of user-programmable message processing rules; and based on the second set of user-programmable message processing rules, processing, by the secondary message function, the selected primary output message to generate, by the secondary message function, a secondary output message formatted according to a second communication protocol, wherein the second communication protocol is different from the SIP protocol.

\* \* \* \* \*